(12) United States Patent
Willuweit et al.

(10) Patent No.: US 11,638,887 B2
(45) Date of Patent: May 2, 2023

(54) FILTER UNIT

(71) Applicant: Lavaris Technologies GmbH, Hof (DE)

(72) Inventors: Thomas Willuweit, Hof (DE); Ralf Griesbach, Hof (DE)

(73) Assignee: OASE GmbH, Hörstel (DE)

( * ) Notice: Subject to any disclaimer, the term of this patent is extended or adjusted under 35 U.S.C. 154(b) by 0 days.

(21) Appl. No.: 16/017,382

(22) Filed: Jun. 25, 2018

(65) Prior Publication Data

US 2019/0168137 A1 Jun. 6, 2019

Related U.S. Application Data

(63) Continuation of application No. 14/761,647, filed as application No. PCT/EP2014/050998 on Jan. 20, 2014, now abandoned.

(30) Foreign Application Priority Data

Jan. 18, 2013 (WO) .................. PCT/IP2013/050482

(51) Int. Cl.
*B01D 29/07* (2006.01)
*B01D 39/08* (2006.01)
(Continued)

(52) U.S. Cl.
CPC .......... *B01D 29/073* (2013.01); *A01K 63/045* (2013.01); *B01D 35/02* (2013.01); *B01D 35/30* (2013.01); *B01D 39/08* (2013.01); *C02F 1/004* (2013.01); *C02F 3/04* (2013.01); *C02F 3/103* (2013.01); *D04B 21/165* (2013.01);
(Continued)

(58) Field of Classification Search
CPC ....... B30B 9/24–248; C02F 3/302–307; A01K 63/045
See application file for complete search history.

(56) References Cited

U.S. PATENT DOCUMENTS 3,012,923 A 12/1961 Slayter
3,209,916 A 10/1965 May et al.
(Continued)

FOREIGN PATENT DOCUMENTS

EP 0 529 671 3/1993
GB 2141352 A * 12/1984 ............. B30B 9/105
WO WO 2014/111558 7/2014

OTHER PUBLICATIONS

International Search Report corresponding to International application No. PCT/EP2014/050998 dated Jun. 3, 2014.
(Continued)

*Primary Examiner* — Jason M Greene
*Assistant Examiner* — Eric J McCullough
(74) *Attorney, Agent, or Firm* — Jenkins, Wilson, Taylor & Hunt, P.A.

(57) ABSTRACT

The invention relates to a filter unit (1, 19), having:
at least one warp-knitted spacer (3) which comprises a first and a second cover layer (4; 5) having in each case a multiplicity of openings (6) which are delimited by peripheral regions (7), wherein threads (8) extend from the peripheral regions (7) of the first cover layer (4) to peripheral regions (7) of the second cover layer (5), and wherein the at least one warp-knitted spacer is rolled, twisted, and/or at least in one portion is compressed.

16 Claims, 9 Drawing Sheets

(51) Int. Cl.
    *C02F 1/00*     (2006.01)
    *C02F 3/10*     (2006.01)
    *B01D 35/02*     (2006.01)
    *C02F 3/04*     (2006.01)
    *B01D 35/30*     (2006.01)
    *A01K 63/04*     (2006.01)
    *D04B 21/16*     (2006.01)
    *C02F 3/30*     (2006.01)
    *C02F 103/00*     (2006.01)

(52) U.S. Cl.
    CPC .. *B01D 2201/06* (2013.01); *B01D 2239/0442* (2013.01); *B01D 2239/0478* (2013.01); *B01D 2239/065* (2013.01); *C02F 3/302* (2013.01); *C02F 2103/007* (2013.01); *C02F 2303/04* (2013.01); *Y02W 10/10* (2015.05)

(56) References Cited

U.S. PATENT DOCUMENTS

| | | | |
|---|---|---|---|
| 3,703,963 A * | 11/1972 | Eguchi | B01D 33/466 210/386 |
| 4,469,600 A * | 9/1984 | Frydman | C02F 3/085 210/150 |
| 4,639,318 A | 1/1987 | Andersson | |
| 5,520,824 A * | 5/1996 | Sasaki | B01D 33/04 210/780 |
| 5,589,245 A | 12/1996 | Roell | |
| 6,146,540 A * | 11/2000 | Nakamura | B01D 29/093 100/153 |
| 6,787,492 B2 | 9/2004 | Oksanen et al. | |
| 7,314,141 B1 * | 1/2008 | Day | B01D 33/042 210/400 |
| 8,245,855 B2 | 8/2012 | Militz | |
| 8,496,120 B2 | 7/2013 | Willuweit | |
| 2003/0146174 A1 * | 8/2003 | Hansen | B01D 9/005 210/770 |
| 2008/0087600 A1 * | 4/2008 | Militz | C02F 1/505 210/501 |
| 2015/0343337 A1 | 12/2015 | Willuweit | |

OTHER PUBLICATIONS

Office Action corresponding to U.S. Appl. No. 14/761,647 dated Dec. 26, 2017.
Translation of International Preliminary Report on Patentability (Chapter I of the Patent Cooperation Treaty) corresponding to PCT/IB2013/050482 dated Jul. 22, 2014.
Translation of Written Opinion of the International Searching Authority corresponding to PCT/EP2014/050998 dated Jul. 18, 2014.
Office Action corresponding to European Patent Application No. 14 706 487.7 dated Apr. 21, 2020.

* cited by examiner

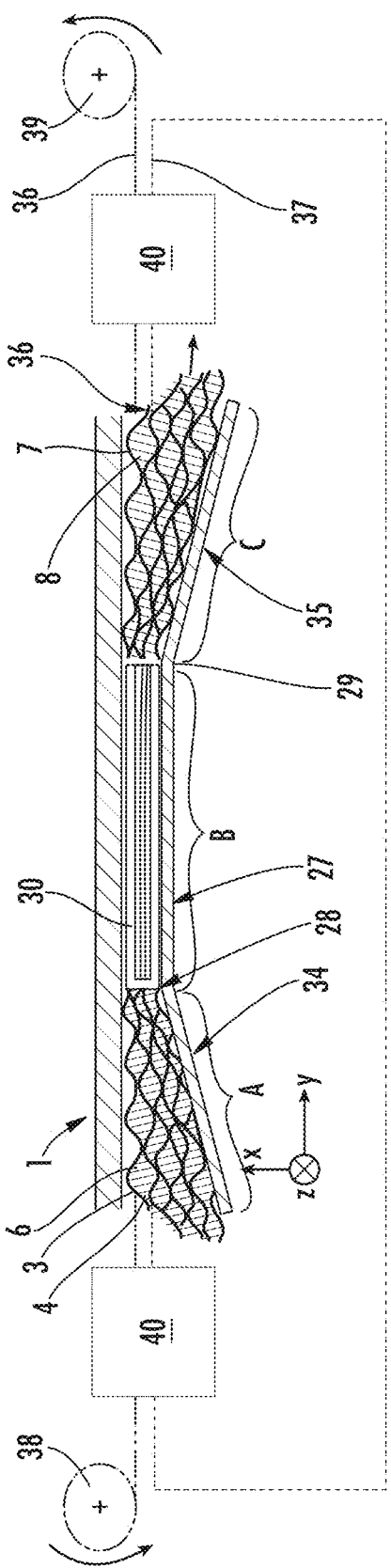
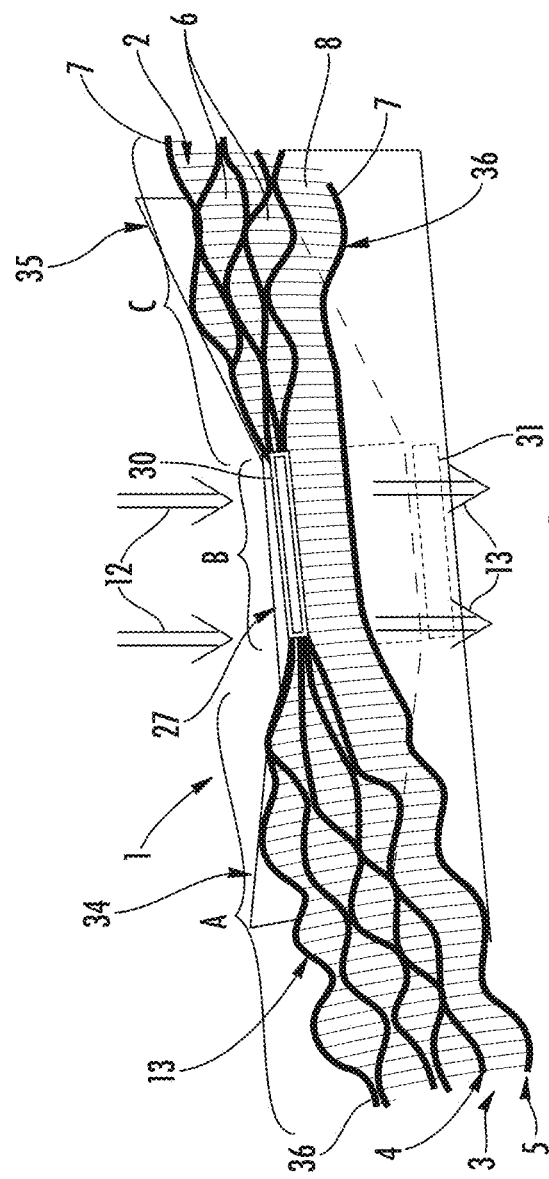
FIG. 5
FIG. 6

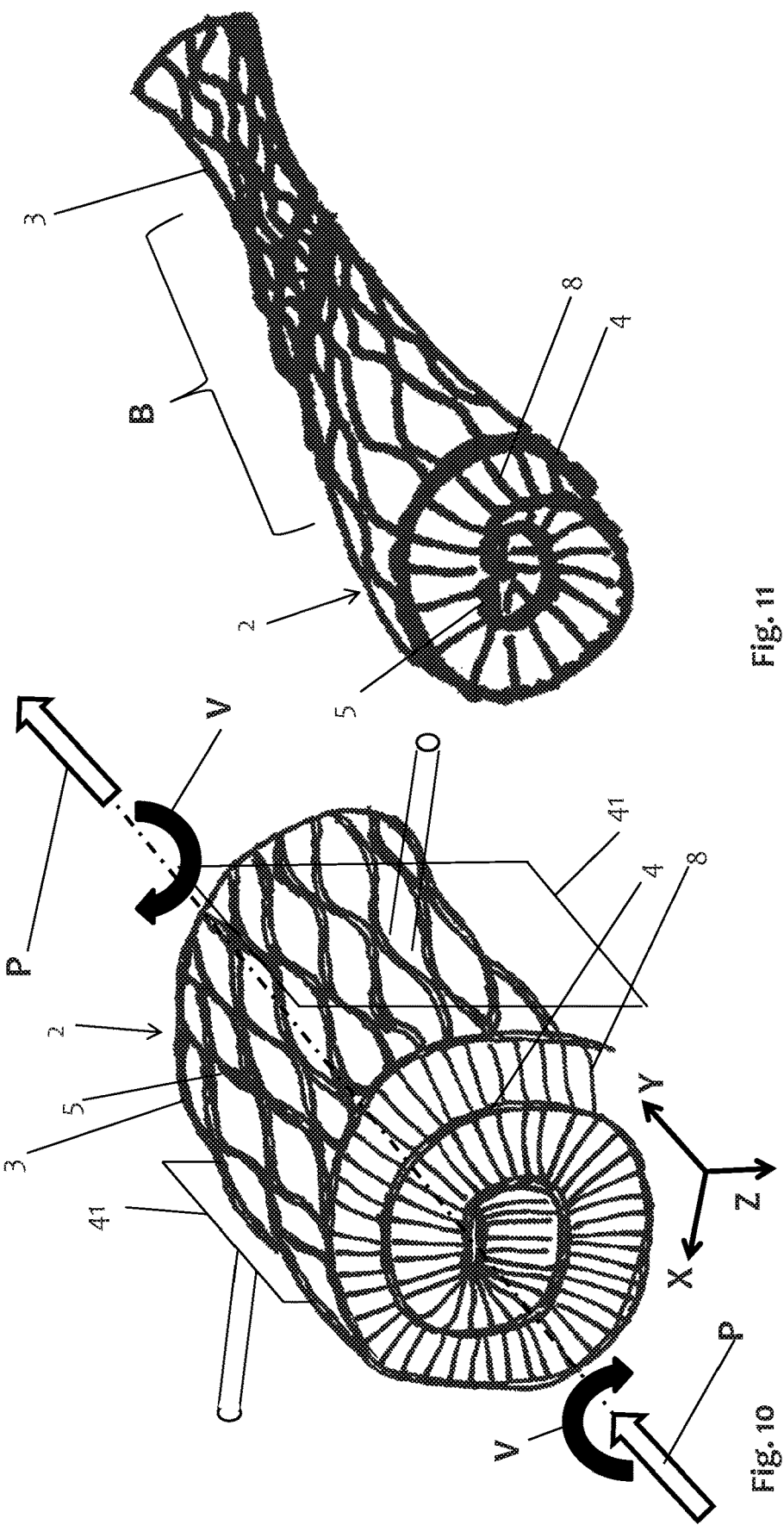

FILTER UNIT

The present innovation relates to a filter unit, in particular to a filter system for water, as used in filters for ponds, aquaria, pools, and aqua-culture plants, for example.

Filter units, in particular for ponds, usually have a plurality of regions for filtration, so as to achieve good filtration efficiency.

One example of a filter unit which is optionally used in a filter system for purifying fluids and may be used for filtering mud and floating algae from water or for purifying gases is disclosed in WO 2009/127436.

However, there is still a requirement for improving the filtration effect, even in such a filter unit. Moreover, there is a requirement for a filter unit which is suitable for populating with microorganisms and which may be coated with chemicals or auxiliaries, for example. Furthermore, there is a requirement for a filter unit, or for a warp-knitted spacer in a filter unit, by way of which nitrification may be achieved.

These objects are achieved by way of a design embodiment as claimed in claim 1.

According to the invention, a filter unit is provided, said filter unit having:

at least one warp-knitted spacer which comprises a first and a second cover layer having in each case a multiplicity of openings which are delimited by peripheral regions, wherein threads extend from the peripheral regions of the first cover layer to peripheral regions of the second cover layer, and wherein the at least one warp-knitted spacer is rolled, twisted, and/or at least in one portion is compressed.

The awareness or concept on which the present invention is based lies in additionally rolling, twisting, and/or compressing the warp-knitted spacer as the filter body, and to direct a fluid to be filtered along between the cover layers of the warp-knitted spacer, or therethrough. On account thereof, the filtration effect can be improved and by way of the degree of compression the throughflow rate can be kept constant.

Advantageous design embodiments and refinements of the invention are derived from the dependent claims and from the description with reference to the drawings.

In one embodiment of the invention, the at least one warp-knitted spacer in at least one portion in the transverse direction or perpendicularly to its cover layers is compressed. Here, a fluid to be filtered may flow along between the cover layers of the at least one warp-knitted spacer and be filtered by the warp-knitted spacer.

In one further embodiment of the invention, the filter unit has the at least one warp-knitted spacer as a filter body. The filter unit here has a receptacle for receiving the warp-knitted spacer as the filter body, for example. The receptacle may be configured in such a manner that the at least one warp-knitted spacer which is received in the receptacle in at least one portion or in a plurality of portions is compressible in the transverse direction, or in a parallel displacement or shearing, respectively, or perpendicularly to its cover layers. In the case of a plurality of portions in which the at least one warp-knitted spacer is compressible, compression and/or decompression may take place in a stepwise manner. In a filtering operation of the filter unit the liquid to be filtered and/or the filtered liquid flows through the warp-knitted spacer between the first and second cover layers of the warp-knitted spacer and is thereby filtered.

According to one embodiment of the invention, the receptacle is provided with an inlet funnel portion. The inlet funnel portion here may be configured in such a manner that it tapers off and, on account thereof, compresses the at least one warp-knitted spacer transversely to its cover layers. The inlet funnel portion has the advantage of being simple to manufacture and of permitting particularly simple compressing of the warp-knitted spacer without additional movable elements.

In one embodiment of the invention, the receptacle is provided with an outlet funnel portion. The outlet funnel portion here may be configured in such a manner that it expands and, on account thereof, permits the at least one warp-knitted spacer to unfold. Likewise, the outlet funnel portion may also be configured in such a manner that it tapers off and, on account thereof, compresses the at least one warp-knitted spacer transversely to its cover layers.

In one other embodiment of the invention, the receptacle has at least one movable slider element. The slider element here may be provided in the receptacle in such a manner that it is movable between a position in which it compresses the at least one warp-knitted spacer transversely to the cover layers and a position in which the warp-knitted spacer is unfolded again or is decompressed. The slider element here may be displaceable or movable in the transverse direction or perpendicularly to the cover layers of the warp-knitted spacer. Additionally or alternatively, the slider element may also be configured so as to be obliquely positionable, so as to form a funnel together with the receptacle, wherein the funnel may expand or taper off in the longitudinal direction of the at least one warp-knitted spacer which is located therebetween.

In one further embodiment of the invention, the filter body is configured as a tape having two ends, or as an endless tape. The receptacle here may be configured in such a manner that the tape is introducible into the receptacle at one end, is guidable or movable through the receptacle and at the other end guidable out of the receptacle again. The tape here for introducing into the receptacle may be unwindable from a roll and introducible into the receptacle and/or the tape after being guided out of the receptacle may be provided so as to be windable onto a roll.

According to another embodiment of the invention, the filter unit has a filter cleaning unit or is linkable to a filter cleaning unit for cleaning the warp-knitted spacer before and/or after a fluid to be filtered flows through the warp-knitted spacer in the receptacle. The filter cleaning unit has the advantage that, on account of the filter unit being cleaned, the latter may be repeatedly employed and/or be employed over a longer period, respectively, and that operating costs may be able to be lowered on account thereof.

In one embodiment of the invention, the receptacle has at least one fluid inlet for directing fluid to be filtered to the at least one warp-knitted spacer and for flowing through the at least one warp-knitted spacer along its cover layers and the threads extending therebetween. The receptacle has at least one fluid outlet for subsequently discharging the fluid filtered by way of the at least one warp-knitted spacer. The fluid inlet here may be connected to a line system or a container, etc., for a fluid to be filtered. Accordingly, the fluid outlet may also be connected to a line system or to a container, etc., for filtered fluid.

In one further embodiment of the invention, a plurality of warp-knitted spacers are provided in the filter unit. The warp-knitted spacers may be disposed beside one another in a cartridge-like manner, for example. Furthermore, the warp-knitted spacers may be additionally rolled and moreover additionally twisted, if required.

According to one embodiment of the invention, the filter body is of metal, a metal alloy, and/or a plastics material, for example polyurethane (PU). Optionally, the plastics material may be additionally coated with a metal or a metal alloy.

In one embodiment of the invention, at least one of the cover layers and/or the threads of the warp-knitted spacer are/is provided with disinfecting means and/or antimicrobially acting means. For example, at least one of the cover layers and/or the threads of the warp-knitted spacer may be provided with a biofilm which protects the bacteria for purifying the water to be filtered from scavengers which would otherwise consume the bacteria. Artificial biofilms may be manufactured from alginates, for example. Here, microorganisms are mixed with alginate solutions. Using this solution, the warp-knitted spacer may be wetted and cure or polymerize, respectively, with the aid of calcium salts, such that an artificial biofilm is formed on each thread of the woven fabric. However, the invention is not limited to this example of a biofilm. Any other biofilm which is suited to protecting in particular bacteria for purifying the water to be filtered from scavengers may be provided.

The present invention will be explained in more detail in the following by means of the exemplary embodiments stated in the schematic figure of the drawing, in which:

FIG. 5 shows an in-principle diagram of a filter unit having a warp-knitted spacer according to one further embodiment of the invention;

FIG. 6 shows a perspective view of the warp-knitted spacer in the filter unit according to FIG. 5;

FIG. 10 shows a perspective view of a warp-knitted spacer, wherein the warp-knitted spacer is additionally rolled; and FIG. 11 shows a perspective view of a warp-knitted spacer, wherein the warp-knitted spacer is rolled and additionally twisted.

Figure 1:
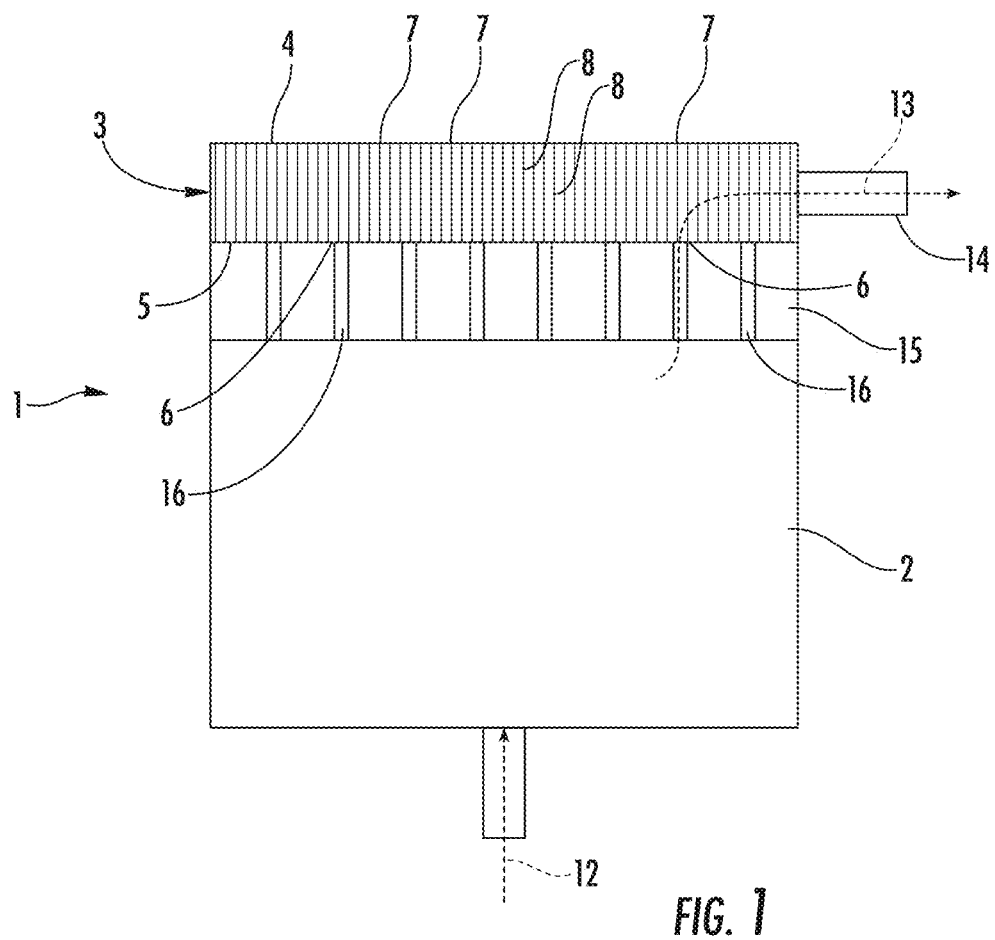
FIG. 1 shows an in-principle diagram of a filter unit according to one embodiment of the invention.
Figure 2:
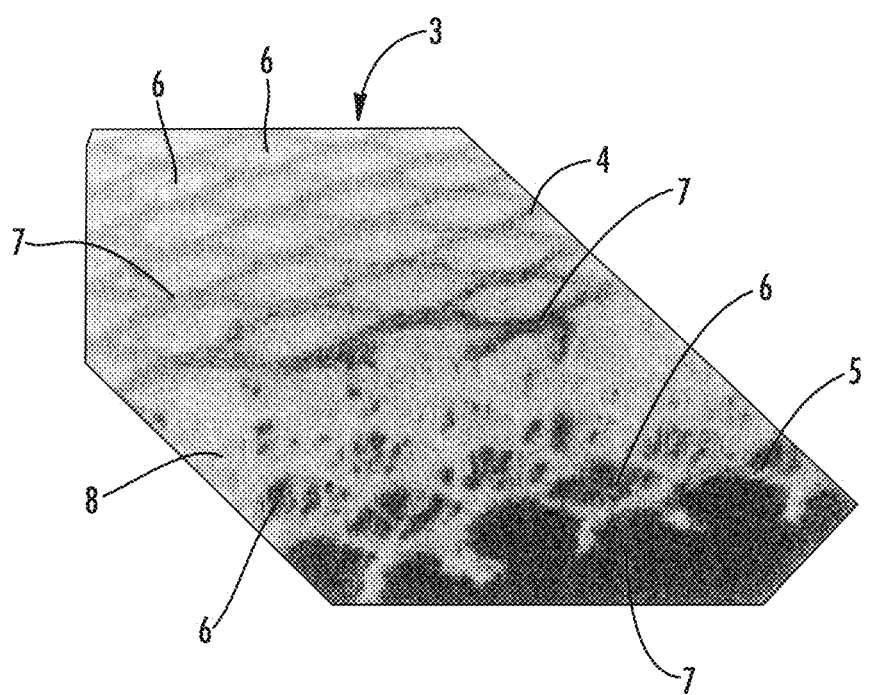
FIG. 2 shows a warp-knitted spacer.

As is illustrated in principle in FIG. 1, the present filter unit (1) has at least one filter body (2) and a warp-knitted spacer (3), a material which is commonplace in the textile industry. The warp-knitted spacer here comprises a first and a second cover layer (4; 5) having a multiplicity of openings (6) which are delimited by peripheral regions (7), wherein threads extend from the peripheral regions (7) of the first cover layer (4) to peripheral regions (7) of the second cover layer (5). One example of such a warp-knitted spacer may be seen in FIG. 2.

The liquid to be filtered is infed to the filter unit (1) as the liquid to be filtered (12) and is discharged as filtered liquid (13), once it has been filtered by means of the filter body (2).

In the design embodiment according to claim 1, the liquid to be filtered (12) and/or the liquid (13) filtered by means of the filter body flow/flows substantially vertically into the warp-knitted spacer (3) and through the warp-knitted spacer between the first and second cover layer (4; 5). On account thereof, an additional filtration effect is achieved, since the liquid to be filtered can readily penetrate the filter material in one direction but not in the other. In comparison with usual filter materials, such as so-called Japanese matting, for example, this offers an improved filtration effect. Furthermore, the material of the warp-knitted spacer is suitable for population by microorganisms and may be coated with chemicals or auxiliaries, respectively. On account thereof, nitrification of the liquid may be achieved.

Advantageously, the filtered liquid (13) flows out of the filter body (1) in a substantially linear manner and into the warp-knitted spacer (3), and thereafter in a transverse manner through the warp-knitted spacer (3) to an outlet of the filter installation (1) On account of the cross flow which arises toward the exit of the fluids, an additional filtration effect is hereby achieved.

In one advantageous design embodiment, such as is illustrated in FIG. 1, for example, a cover plate (15) having openings (16) is disposed between the warp-knitted spacer (3) and the filter body (2), through which cover plate (15) the filtered liquid (13) flows out of the filter body (2) through the openings (16) in the cover plate (15) in a substantially perpendicular manner into the warp-knitted spacer (3). On account thereof, the effect of the cross flow which is now perpendicular in relation to the exit opening from the filter body (2) is further improved.

The cover plate (15) preferably prevents mixing of the filtered liquid and the liquid to be filtered (13; 12), so as to prevent subsequent contamination of the filtered liquid (13) by mixing with the liquid to be filtered (12) and to thus prevent or mitigate, respectively, potential contamination of the warp-knitted spacer (3).

In one special design embodiment, the warp-knitted spacer (3), in particular the threads (8) thereof, are provided with disinfecting or antimicrobioally acting means which further improve purifying of the liquid to be filtered (12).

Figure 3:
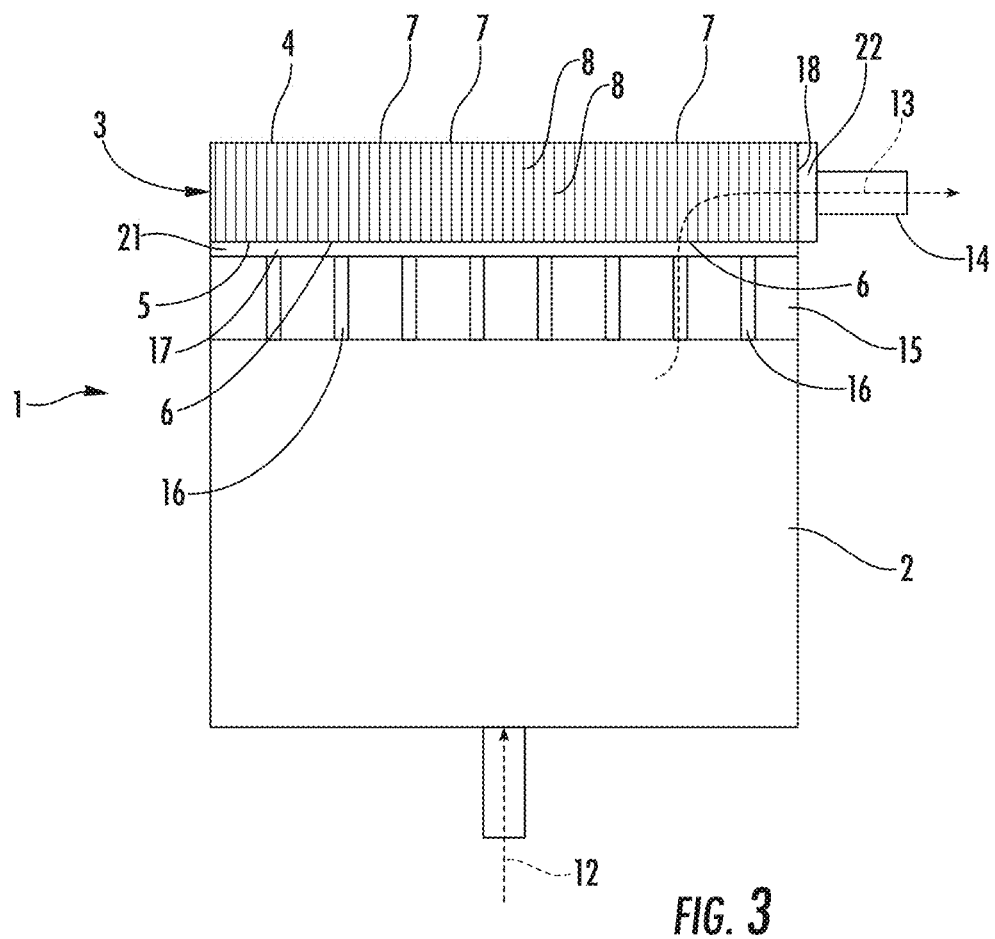
FIG. 3 shows an in-principle diagram of a filter unit according to one further embodiment of the invention.

Further improvement of the filtration effect is achieved when a paper layer (21; 22) is applied to at least one cover area (17) and/or lateral area (18) of the warp-knitted spacer (3), as is illustrated in FIG. 3, for example.

Furthermore, the filter unit (1) may comprise an installation (23) for generating gas bubbles (24), which is disposed below the warp-knitted spacer (3), such that the gas bubbles (24) interact with the threads (8) of the warp-knitted spacer (3), so as to thereby be able to release deposits (25) from the threads (8). On account thereof, contamination of the warp-knitted spacer (3) is largely avoided or prevented, respectively.

The warp-knitted spacer (3) may be advantageously used together with the filter body (2) according to the innovation, in particular for filtering liquids. In particular, the innovative filter unit or a warp-knitted spacer, such as has been defined for the innovation, may be used for nitrification.

One further advantageous design embodiment comprises a filter unit (19), which has a warp-knitted spacer (3) which comprises a first and a second cover layer (4; 5) having in each case a multiplicity of openings (6) which are delimited by peripheral regions (7), wherein threads (8) extend from the peripheral regions (7) of the first cover layer (4) to peripheral regions (7) of the second cover layer (5), and an installation (23) for generating gas bubbles (24), which is disposed below the warp-knitted spacer (3), such that the gas bubbles (24) interact with the threads (8) of the warp-knitted spacer (3), so as to thereby release deposits (25) from the threads (8). On account thereof, contamination of the warp-knitted spacer (3) is further avoided or prevented, respectively. Such an installation (24) for generating gas bubbles (23) is shown in FIG. 4, for example.

This filter unit (19) is preferably designed such that in a filtration operation of the filter unit (19), the liquid to be filtered (12) and/or the filtered liquid (13) substantially flows through the warp-knitted spacer (3) between the first and second cover layer (4; 5).

Figure 4:
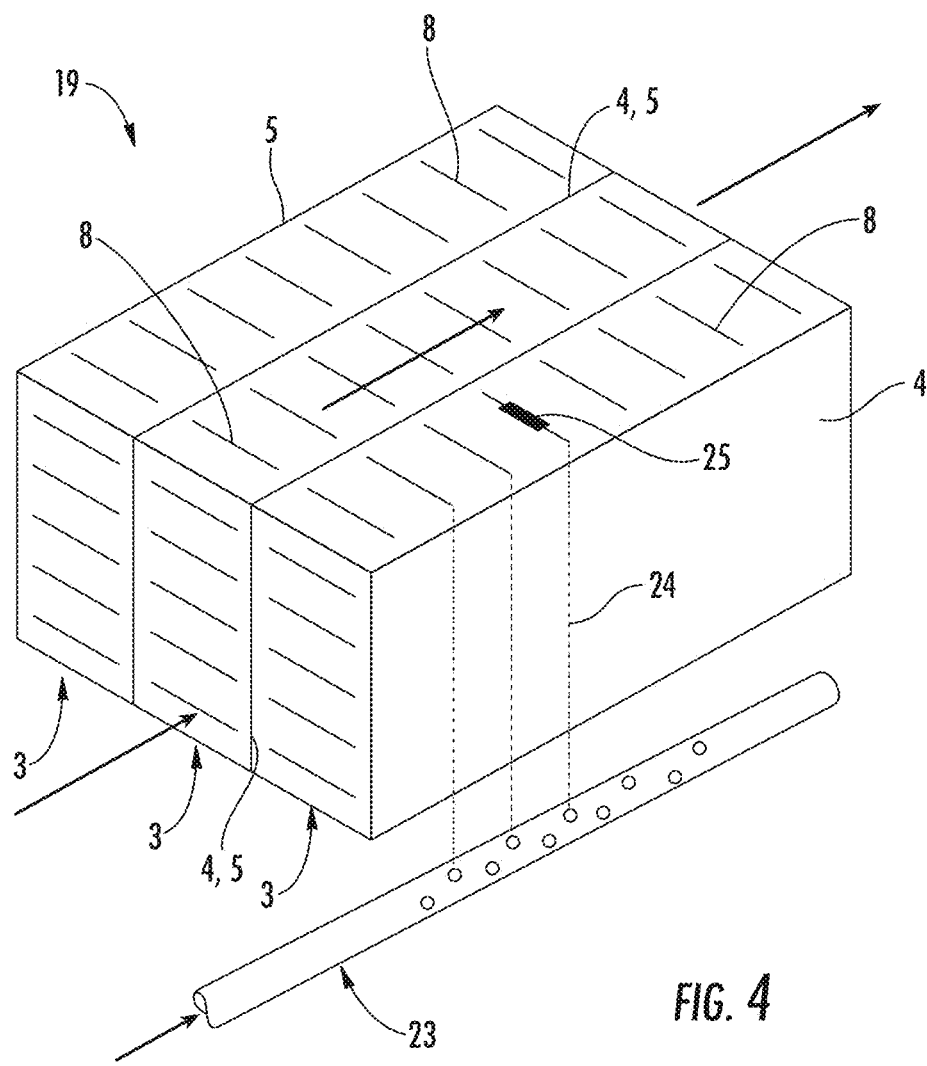
FIG. 4 shows an in-principle diagram of a filter unit according to even one further embodiment of the invention.

In particular, a plurality of the warp-knitted spacers (3) in the filter unit (19) may be disposed beside one another in a cartridge-like manner in the filter unit (19), as is illustrated in FIG. 4, on account of which further improvement of the filtration effect is achieved.

An in-principle diagram of a filter unit (1) having a filter body (2) in the form of a warp-knitted spacer (3) according to one further embodiment of the invention is shown in FIG. 5. FIG. 6 shows a perspective view of the filter body (2) or of the warp-knitted spacer (3), respectively, in the filter unit (1) according to FIG. 5.

The filter body (2) as a warp-knitted spacer (3) has a first and a second cover layer (4, 5), having a plurality of openings (6), wherein the filter body (2) is compressible transversely to the warp-knitted spacer (3) and to the first and second cover layer (4, 5), as is shown in FIGS. 5 and 6.

Furthermore, the filter unit (1) has a receptacle (27) for receiving and compressing the compressible filter body (2) and filtering a fluid to be filtered by means of the compressed filter body (2). The receptacle (27) here is configured in such a manner that the filter body (2) or the warp-knitted spacer (3), respectively, which is received in the receptacle (27) is compressed in its transverse direction or the direction X in FIG. 5, and may be passed through perpendicularly to its cover layer (4) or (5), respectively, or as is shown in FIG. 5 in the direction Z by a fluid to be filtered (12), wherein the fluid to be filtered (12) is thereby filtered and can be removed or discharged from the filter unit (1) as a filtered fluid (13) on the other side of the warp-knitted spacer (3). A compressing portion B of the receptacle (27) in which the filter body (2) in the form of the warp-knitted spacer (3) is compressed in the filter unit (1) is shown in FIGS. 5 and 6.

As is shown in FIG. 5, the receptacle (27) has an inlet opening (28) and an outlet opening (29) for introducing and guiding the filter body (2) in the form of the warp-knitted spacer (3) into and through the receptacle (27). Furthermore, as is indicated in FIGS. 5 and 6 by a chain-dotted line, the receptacle (27) has an additional fluid inlet (30) and a fluid outlet (31) for infeeding the fluid to be filtered (12) from one side of the warp-knitted spacer (3) and for discharging or removing the filtered fluid (13) on the other side of the warp-knitted spacer (3).

The fluid inlet (30) here may optionally be provided with a connector or be configured so as to be connectable, for example, for connecting an installation having a fluid to be filtered, for example, such as a container having a fluid to be filtered, a line system having a fluid to be filtered, etc. Accordingly, the fluid outlet (31) may be optionally provided with a connector or be configured so as to be connectable, for connecting, for example, an installation for receiving or introducing a filtered fluid, such as a container, a line system, etc.

As is shown in the exemplary embodiment in FIG. 5, the inlet opening (28) of the receptacle (27) is additionally provided for example with an inlet funnel portion (34) or a portion which in its cross section tapers off and which is configured in such a manner that the filter body (2) or the warp-knitted spacer (3) is compressed transversely or perpendicularly to the first and second cover layer (4, 5) or in the direction X in FIG. 5. The region A of the inlet funnel portion of the filter unit (1) is shown in FIGS. 5 and 6. The receptacle (27) here may be configured in such a manner in the region B that said receptacle (27) receives the filter body (2) without further compressing the latter, for example, but retains said filter body (2) only in its compressed state, since the inlet funnel portion (34) (region A) has sufficiently compressed the filter body (2) in order for the fluid to be filtered (12) to be filtered. Likewise, the inlet funnel portion (34) and the receptacle (27) may be configured in such a manner that the inlet funnel portion (24) compresses or pre-compresses the filter body (2) in a first step, and the receptacle (27) (region B) further compresses the filter body (2) to a sufficient dimension in order for a fluid to be filtered to be suitably filtered.

Additionally, the outlet opening (29) of the receptacle (27) may also be provided with an outlet funnel portion (35) which in its cross section expands in such a manner that the filter body (2) is slowly unfolded or decompressed. The region C of the outlet funnel portion (35) of the filter unit (1) is likewise shown in FIGS. 5 and 6.

As is indicated in FIG. 5 by a double-dotted line, the filter body (2) may be configured as a tape (36) having a first and second end, which is unwound from a first roll (38) and introduced into the inlet opening (28) and guided through the receptacle (27) of the filter unit (1), so as to be wound on a second roll (39) after leaving the outlet opening (29) of the filter unit (1), for example.

Likewise, the tape (36) may also be configured as an endless tape (37), as is indicated by a dashed line in FIG. 5.

If the fluid to be filtered (12) has flowed though a portion of the tape (36) or the endless tape (37), the tape (36) may be moved onward by means of the rolls (38), (39), or the endless tape (37) may be moved onward by means of a suitable device, such that next a new portion of the filter body (2) may be disposed in the receptacle (27) for filtering and by way of the fluid inlet (30) a fluid to be filtered (13) may be guided through the fresh portion of the filter body (2) and be filtered.

Additionally, the filter unit (1) may optionally have a filter cleaning unit (40) or be linked to a filter cleaning unit (40), as is indicated by a dotted line in FIG. 5, for cleaning the filter body (2) before and/or after a fluid to be filtered (12) flows through the filter body (2) in the receptacle (27).

As a filter cleaning unit (40), the filter body (2) upstream or in the region of the inlet funnel portion (34) and/or downstream or in the region of the outlet funnel portion (35) may have a rinsing device for rinsing the filter body (2) with water, water vapor and/or any other suitable liquid and/or gaseous cleaning medium.

This has the advantage that the endless tape (37) may be cleaned and thus always be repeatedly used prior to being replaced, for example.

The same applies to the tape (36). Once a portion has been used for filtering and has been moved out of the receptacle (27), said tape (36) may initially be cleaned by a downstream filter cleaning unit (40) and subsequently may be moved back into the receptacle (27), in order to filter a fluid to be filtered (12). Subsequently, the portion for filtering may be again cleaned by the downstream filter cleaning unit (40) and again be moved back into the receptacle (27), in order to filter a further fluid to be filtered (12). These steps may be repeated as often as the portion of the filter body (2) can be sufficiently cleaned so as to suitably filter a fluid to be filtered (12). If the portion of the filter body (2) can no longer be sufficiently cleaned, the tape (36) or (37), respectively, may be moved onward, such that the next clean portion of the filter body (2) is ready or disposed in the receptacle (27), in order to filter a fluid to be filtered (12). For this new clean portion of the filter body (2), the aforementioned steps of cleaning the portion of the filter body (2), of renewed filtering by the portion of the filter body (2) may be repeated until this portion of the filter body (2) is also consumed or can no longer be sufficiently cleaned, and the tape (36) or (37), respectively, has to be moved onward to the next clean portion.

As has already been described with reference to FIGS. 1 to 4, the filter body (2) has a warp-knitted spacer (3) having an upper and a lower cover layer 4 and 5, respectively. The openings (6) of the cover layers (4, 5) of the filter body (2) are delimited by peripheral regions (7), wherein threads (8) extend from the peripheral regions (7) of the first cover layer (4) to the peripheral regions (7) of the second cover layer (5) and form the warp-knitted spacer (3).

The filter body (2) may for example be composed of metal, a metal alloy and/or a plastics material, in particular polyurethane (PU), wherein the plastics material is coated with a metal or a metal alloy, for example. Moreover, the filter body (2) furthermore may optionally be at least partially or completely provided with a suitable coating which kills germs, viruses, bacteria and/or fungi, etc.

Figure 7:
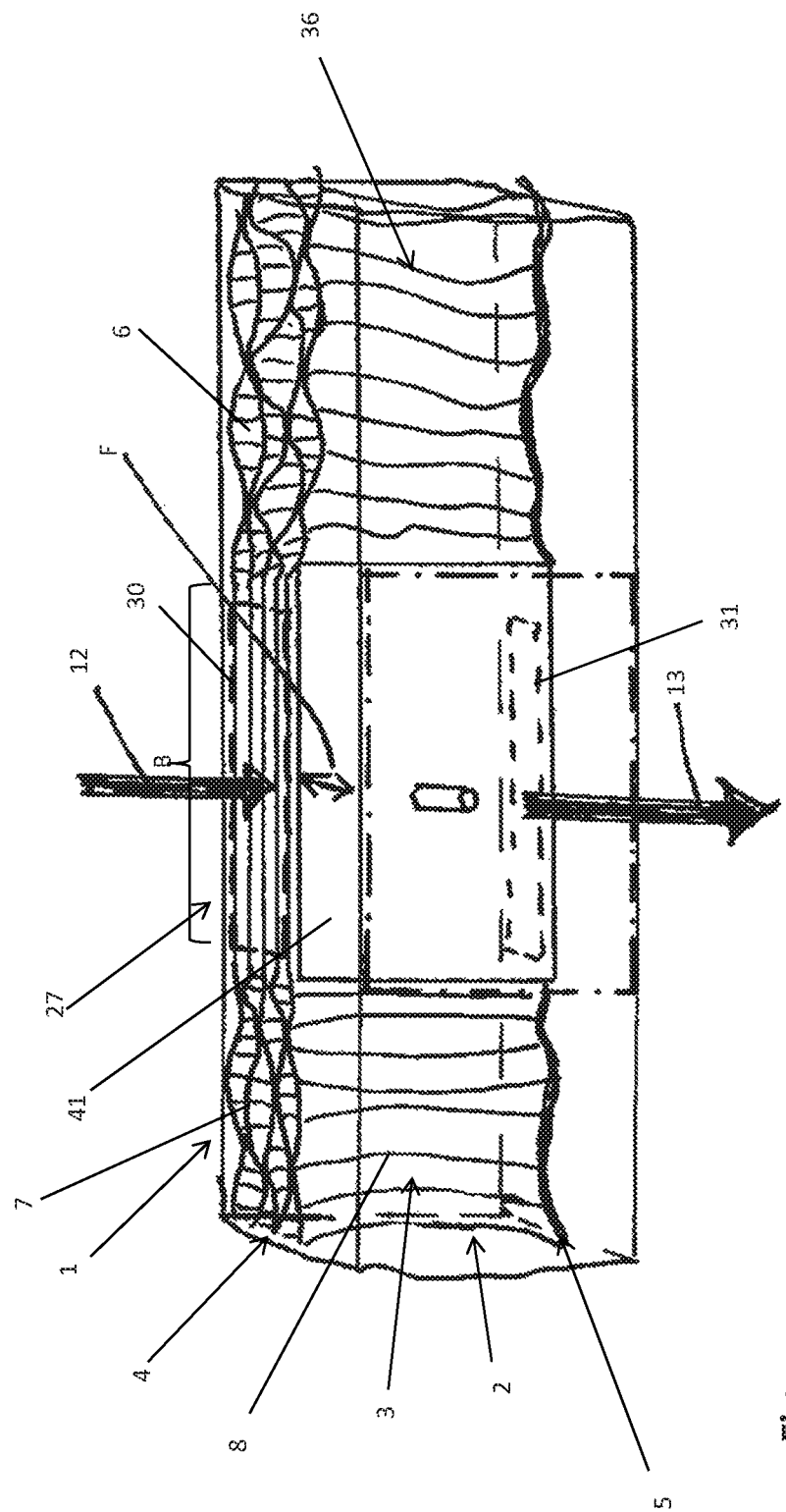
FIG. 7 shows an in-principle diagram of a filter unit according to one further embodiment of the invention.

FIG. 7 furthermore shows an in-principle diagram of a filter unit (1) according to one further embodiment of the invention. The warp-knitted spacer (3) which has been described above, for example with reference to FIGS. 5 and 6, is employed in the filter unit (1) here as the filter body (2), so that reference is made to the description to this end of FIGS. 5 and 6.

The filter unit (1) according to FIG. 7 here differs from the filter unit according to FIGS. 5 and 6 in that a slider element (41) is provided, which in the receptacle (27) is movable between a position for compressing and decompressing the filter body (2). The slider element (41) here may be displaced in the receptacle (27) of the filter unit (1) between a position in which it sufficiently compresses the filter body (2) so as to filter a fluid to be filtered and a position, as is indicated by a chain-dotted line in FIG. 7, in which the filter body (2) is at least partially or completely unfolded again in such a manner, for example. The movement of the slider element (41) in the receptacle (27) is indicated by an arrow F in FIG. 7. On account thereof, the receptacle (27) may be provided with a constant cross section, for example. Here, an inlet funnel portion and an outlet funnel portion, such as shown in the embodiment in FIGS. 5 and 6, may be dispensed with. However, this is not mandatory.

If the slider element (41) sufficiently compresses the filter body (2) in order for a fluid to be filtered (12) to be filtered, the fluid to be filtered (12) may be introduced by way of a corresponding fluid inlet (30) of the receptacle (27) in a perpendicular or transverse manner to the cover layer (4) of the warp-knitted spacer (3) and directed through the warp-knitted spacer (3). The completely filtered fluid, having passed the warp-knitted spacer (3), then leaves the receptacle (27) by way of a fluid outlet (31) on the lower side of the receptacle (27).

As has been previously described with reference to FIGS. 5 and 6, the fluid inlet (30) may optionally be provided with a connector or be configured so as to be connectable, for example, in order for an installation having a fluid to be filtered, such as a container having a fluid to be filtered, a line system having a fluid to be filtered, etc., to be connected, for example. Accordingly, the fluid outlet (31) may optionally be provided with a connector or be configured so as to be connectable, for example, in order for an installation for receiving or introducing a fluid to be filtered, such as a container, a line system, etc., to be connected, for example.

Furthermore, as has been previously described with reference to FIGS. 5 and 6, the warp-knitted spacer (3) or the filter body (2), respectively, may be provided as a tape (36) which is unwound from a first roll and is guided through the filter unit (1) and at the other end is wound onto a second roll again, for example. Likewise, the warp-knitted spacer (3) or the filter body (2), respectively, may also be provided as an endless tape (37) which is moved in the receptacle (27) by means of a suitable device, such that a fresh portion of the tape may always be passed through by a fluid to be filtered (12), as has likewise been previously described with reference to FIGS. 5 and 6.

Furthermore, a filter cleaning unit (1) for cleaning the filter body (2) may be provided upstream and/or downstream of the portion of the receptacle (27) where the filter body (2) is impinged with the fluid to be filtered (12), as has previously been shown and described in FIG. 5.

Moving the filter body (2) through the receptacle (27) of the filter unit (1) may be performed manually and/or mechanically. For example, the first and second roll or the device for moving the endless tape may be suitably controlled by means of a controller which actuates the rolls or the device, respectively, such that the filter body (2) is suitably moved in and through the filter unit (1), in order for a fluid to be filtered (12) to be cleaned. The rolls here are preferably rotatable by way of corresponding motors. The same applies to the device for moving the warp-knitted spacer (3) as an endless tape (37) in the filter unit (1).

The same applies to the slider element (41). The slider element (41) may be manually and/or mechanically moved in the filter unit (1), in order for the filter body (2) in the filter unit (1) to be compressed and decompressed.

As has been previously described with reference to FIG. 7, the cross section of the receptacle (27) of the filter unit (1) here may be configured so as to be constant, or the receptacle (27) may be configured having an inlet funnel portion and/or outlet funnel portion.

Furthermore, the filter unit (1) having the receptacle (27) for the filter body (2) may be configured as a closed housing into which the filter body (2) is placeable, wherein the housing merely has the fluid inlet (30) and the fluid outlet (31). Optionally, the filter unit (1) may have an additional inlet opening (28) and/or outlet opening (29) for the filter body (2), such that the filter body (2), if and when the inlet and outlet opening (28, 29) are provided, is introducible through the filter unit (1) and guidable therethrough, as is shown in FIGS. 5, 6, and 7.

Figure 8:
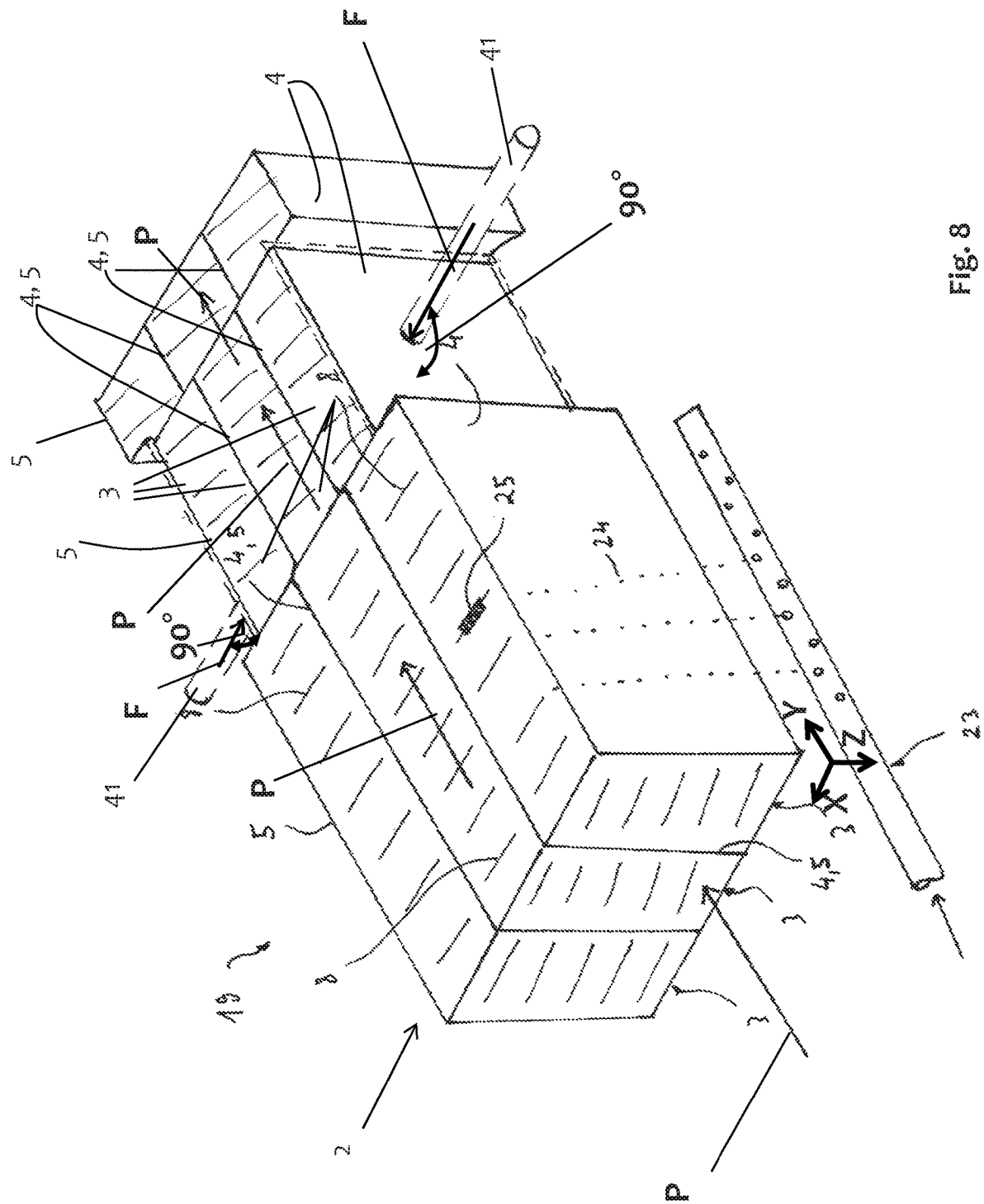
FIG. 8 shows an in-principle diagram of a filter body in the form of a plurality of warp-knitted spacers according to one even further embodiment of the invention.

In FIG. 8, an in-principle diagram of a filter body (2) in the form of a plurality of warp-knitted spacers (3) according to one even further embodiment of the invention is shown.

Figure 9:
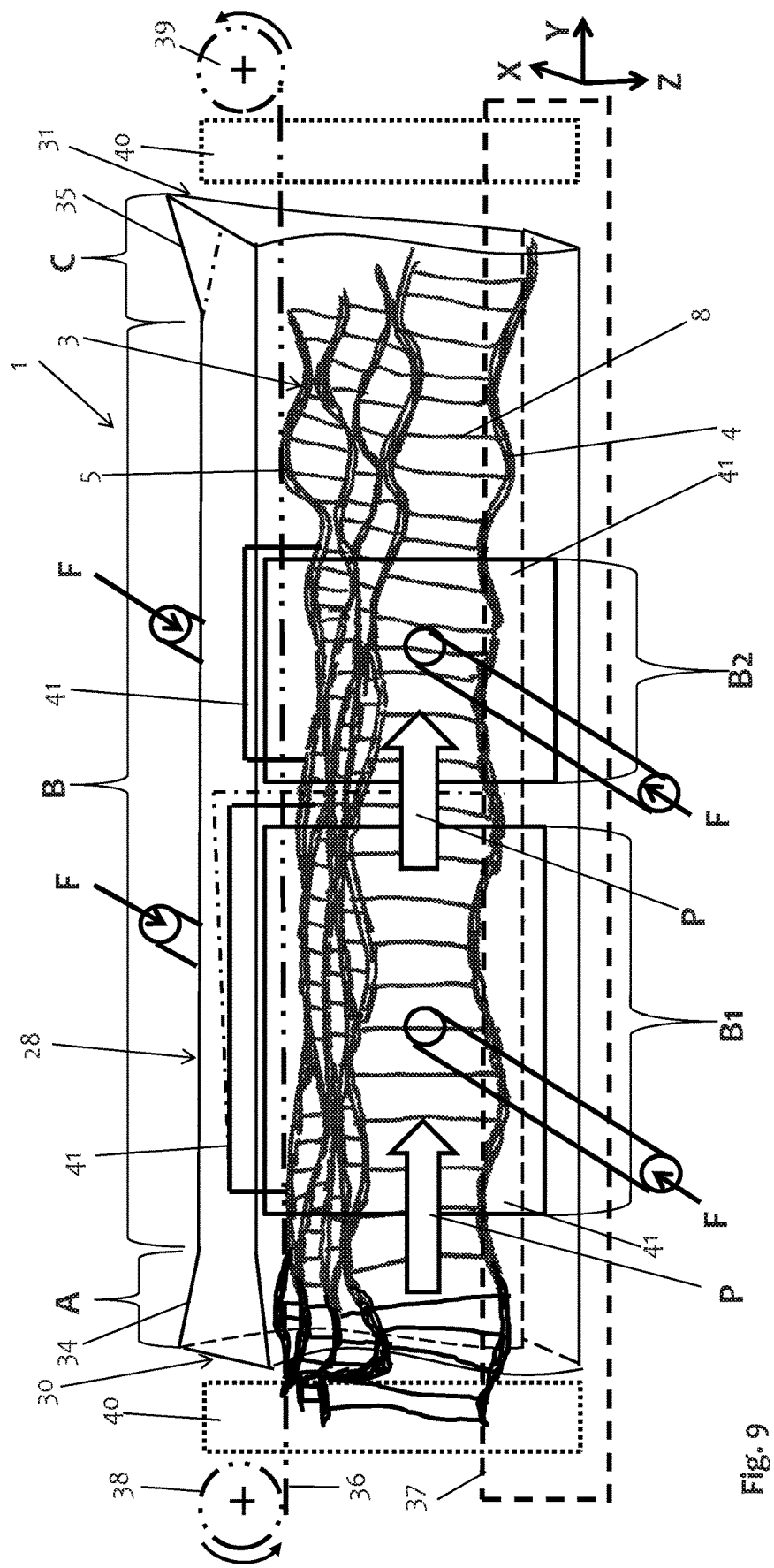
FIG. 9 shows in in-principle diagram of a filter unit having a warp-knitted spacer according to one further embodiment of the invention.

The respective warp-knitted spacer (3) as employed in FIG. 8 and the subsequent FIGS. 9, 10, and 11, here comprises a first and a second cover layer (4; 5) having a multiplicity of openings (6) which are delimited by peripheral regions (7), wherein threads (8) extend from the peripheral regions (7) of the first cover layer (4) to peripheral regions (7) of the second cover layer (5). The construction of the warp-knitted spacer (3) has already been described in detail with reference to FIGS. 1 to 7, such that unnecessary repetitions are dispensed with and reference is made instead to the description for FIGS. 1 to 7.

The embodiment according to FIG. 8 is based on the embodiment shown in FIG. 4. Here, a plurality of warp-knitted spacers (3) are disposed beside one another in a cartridge-like manner in the filter unit (19), on account of which further improvement of the filtration effect is achieved. Moreover, a fluid to be filtered, for example water to be filtered, as is shown in FIGS. 4 and 8, flows through the warp-knitted spacer (3), between the cover layers (4, 5) or transversely to the warp-knitted spacer (3) or in the longitudinal direction thereof, respectively. The flow direction of the fluid to be filtered through the warp-knitted spacers (3) is indicated with arrows P in FIG. 8.

The embodiment according to FIG. 8 differs from the embodiment according to FIG. 4 in that the warp-knitted spacers (3) are additionally compressed. As is indicated in a highly simplified manner in FIG. 8, the warp-knitted spacers (3) in FIG. 8 are compressed in their transverse direction (direction X) or perpendicularly to their cover layers (4, 5). Compressing of the warp-knitted spacers (3) in their transverse direction or perpendicularly to their cover layers (4, 5), respectively, is indicated in FIG. 8 with arrows F.

Compressing of the warp-knitted spacer (3) also takes place in the embodiment as shown in FIG. 5. In contrast to the embodiment in FIG. 8, the warp-knitted spacer (3) in the exemplary embodiment in FIG. 5 is flowed through in another direction. In FIG. 5, the warp-knitted spacer (3) is flowed through perpendicularly to its cover layers (4, 5), or in the direction Z, respectively. By contrast, in the exemplary embodiment in FIG. 8 the warp-knitted spacers (3) are flowed through transversely or in their longitudinal direction (direction Y), as indicated in FIG. 8 with arrows P. The fluid to be filtered (12) in FIG. 8 thus flows along between the cover layers (4, 5) of the respective warp-knitted spacer (3).

If and when required, the cross section of the warp-knitted spacer (3) in FIG. 8 may be reduced by compressing the warp-knitted spacer (3) in its transverse direction or perpendicularly to its cover layers (4, 5). The more intensely the warp-knitted spacer (3) is compressed, the slower the flow of a fluid to be filtered (12), for example water to be filtered, through the warp-knitted spacers (3), and the more intense the filtration that the fluid to be filtered (12) may be subjected to.

By means of compressing the warp-knitted spacer (3) in the transverse direction of the warp-knitted spacer (3), the filtration effect may thus be adapted to a fluid to be filtered and, depending on the degree of compression of the warp-knitted spacer (3), more or less intense filtration of the fluid to be filtered (12) may be achieved. For example, compressing the warp-knitted spacer (3) may be adjusted so as to be dependent on at least one parameter. One such parameter is, for example, the degree of contamination of the fluid to be filtered, the type of materials or constituent parts to be filtered from the fluid to be filtered, the number of filtration cycles through which the fluid to be filtered (12) passes when being filtered by the warp-knitted spacer (3), etc.

Moreover, compressing of the warp-knitted spacer (3) or of the warp-knitted spacers (3) may be adjusted such that the throughflow of the fluid to be filtered (12) remains constant or almost constant.

Instead of compressing only one portion of the warp-knitted spacers (3), in one embodiment of the invention as is shown in the exemplary embodiment in FIG. 8, a plurality of mutually successive portions of the warp-knitted spacers (3) may be compressed, or the warp-knitted spacer (3) may be compressed across its entire length. One exemplary embodiment in which a plurality of mutually successive portions of the warp-knitted spacer (3) are compressed is shown in the following FIG. 9. The portions of the warp-knitted spacers (3) to be compressed here may all be compressed with equal intensity and accordingly all have a compressed cross section of identical size. Likewise, the portions of the warp-knitted spacers (3) to be compressed may also be compressed with different intensity, and their compressed cross sections accordingly may be of different sizes.

Furthermore, at least one installation (23) for generating gas bubbles (24) may optionally be additionally provided, as is shown in FIG. 8. The installation for generating gas bubbles (23) may be disposed below the warp-knitted spacer (3), for example, such that the gas bubbles (24) interact with the threads (8) of the warp-knitted spacer (3), so as to, on account thereof, release deposits (25) from the threads (8). On account thereof, contamination of the warp-knitted spacer (3) is furthermore avoided or prevented, respectively. As is shown in the exemplary embodiment in FIG. 8, such an installation (24) for generating gas bubbles (23) may be disposed, for example, upstream of the region of the warp-knitted spacers (3) to be compressed, in the region of the warp-knitted spacers (3) to be compressed, and/or downstream of the region of the warp-knitted spacers (3) to be compressed, below and/or above the warp-knitted spacers (3).

An in-principle diagram of a filter unit (1) having at least one warp-knitted spacer (3) as the filter body (2) according to one further embodiment of the invention is shown in FIG. 9.

The filter body (2) of the filter unit (1) is composed of at least one warp-knitted spacer (3), as has been previously described with reference to FIGS. 1 to 8. The warp-knitted spacer (3) has a first and a second cover layer (4, 5) having a multiplicity of openings (6). The filter body (2) or the warp-knitted spacer (3), respectively here is compressible in the transverse direction or perpendicularly to the first and second cover layer (4, 5), as is shown in FIG. 9 and previously in FIG. 8.

The filter unit (1) has a receptacle (27) for receiving and compressing the compressible filter body (2) and for filtering a fluid to be filtered (12), for example water, by means of the compressed filter body (2). The receptacle (27) here is configured in such a manner that the compressible filter body (2) which is received in the receptacle (27), or the at least one warp-knitted spacer (3), respectively, is at least in portions compressed in its transverse direction (direction X) or perpendicularly to its cover layer (4, 5), as is indicated with arrows F in FIG. 9.

In the exemplary embodiment as shown in FIG. 9, two portions B1 and B2 which are mutually successive in the longitudinal direction or the direction Y of the warp-knitted spacer (3) are compressed with identical intensity or, as is indicated in FIG. 9, with different intensities, for example.

To this end, the warp-knitted spacer (3) in the exemplary embodiment in FIG. 9 is compressed in the respective portions B1 and B2, respectively, by means of two slider elements (41). Here, at least one slider element (41) is configured so as to be movable and may be moved in the direction of the other slider element (41) and hereby compress the at least one warp-knitted spacer (3) which is disposed therebetween. Likewise, only one movable slider element (41) which is movable in the direction X in the direction of the wall of the receptacle (27) may also be provided, in order for the warp-knitted spacer (3) to be compressed between the slider element (41) and the wall in the transverse direction (direction X) or perpendicularly to the cover layers (4, 5) of the warp-knitted spacer (3).

In the exemplary embodiment shown in FIG. 9, both slider elements (41) are disposed so as to be parallel with one another in the longitudinal direction or the direction Y, respectively of the warp-knitted spacer (3) and so as to be displaceable in relation to one another in the transverse direction of the warp-knitted spacer or in the direction X, respectively. Depending on how far the slider elements 41 are pushed together in relation to one another, the warp-knitted spacer (3) is compressed therebetween.

In one embodiment of the invention, at least one of the slider elements 41 is configured and disposed in the receptacle (27) in such a manner that, instead of being moved parallel with the other slider element (41) or in the direction X, it can be obliquely placed in relation to the other slider element (41), as is indicated with a chain-dotted line in FIG. 9. On account thereof, a funnel portion which expands in the longitudinal direction of the warp-knitted spacer (3) or in the direction Y, respectively, may be configured, such as is shown with a chain-dotted line in FIG. 9, or which tapers off in the longitudinal direction of the warp-knitted spacer (3) or in the direction Y, respectively, may be configured (not illustrated).

The warp-knitted spacer (3) is flowed through transversely (direction Y) or in the longitudinal direction of the warp-knitted spacer (3), as is indicated with arrows P in FIG. 9. The fluid to be filtered (12) at one side flows into the warp-knitted spacer (3) between the cover layers (4, 5) and flows through the warp-knitted spacer (3) in the longitudinal direction or the direction Y. It is hereby filtered and exits at the other side of the warp-knitted spacer (3) as a filtered fluid (13) and may be removed or discharged from the filter unit (1).

As is indicated in FIG. 9, the receptacle (27) is configured in such a manner so as to receive at least one warp-knitted spacer (3) and to be flowed through transversely or in the longitudinal direction or the direction Y, respectively. In the exemplary embodiment as is shown in a heavily simplified manner in FIG. 9, the receptacle (27) may additionally be configured in such a manner that the warp-knitted spacer (3) is movable through the receptacle (27). To this end, the warp-knitted spacer (3), for example as an endless tape as is indicated with a dashed line, may be moved through the receptacle (27) and in the receptacle (27) be flowed through transversely or in the longitudinal direction or the direction Y, respectively, by a fluid to be filtered (12).

Alternatively, the warp-knitted spacer (3) may also be configured as a tape (36) having two ends and be provided for example to be unwindable from a first roll (38), be guidable through the receptacle (27), an at the other end of the receptacle (27) be windable onto a second roll (39). The warp-knitted spacer (3) here in the receptacle (27) is likewise flowed through transversely or in the longitudinal direction or the direction Y, respectively, by a fluid to be filtered (12), as is indicated with the arrows P. The fluid to be filtered (12) here flows between the cover layer (4, 5) in the longitudinal direction through the warp-knitted spacer (3) and is hereby filtered.

If a portion of the tape (36) or the endless tape (37) has been flowed through by the fluid to be filtered (12), the tape (36) may be moved onward by means of the rolls (38), (39), or the endless tape (37) may be moved onward by means of a suitable device, such that next a new portion of the filter body (2) is disposed in the receptacle (27) for filtering, and a fluid to be filtered (12) may be directed in the longitudinal direction of the warp-knitted spacer (3) or transversely through the warp-knitted spacer (2) in the receptacle (27).

The receptacle (27) here may be configured in such a manner for introducing and guiding through the filter body (2) through the receptacle (27). The receptacle (27) furthermore has a fluid inlet (30) and a fluid outlet (31), for example. In the heavily simplified illustration in FIG. 9, the fluid to be filtered flows through the fluid inlet (30) into the receptacle (27) and subsequently out through the fluid outlet (31) of the receptacle (27) as the filtered fluid (13).

The fluid inlet (30) here may optionally be provided with a connector or be configured so as to be connectable, for example, for connecting an installation having a fluid to be filtered, for example, such as a container having a fluid to be filtered, a line system having a fluid to be filtered, etc. Accordingly, the fluid outlet (31) may be optionally provided with a connector or be configured so as to be connectable, for connecting, for example, an installation for receiving or introducing a filtered fluid, such as a container, a line system, etc.

An inlet region A of the receptacle (27) may be additionally be provided with an inlet funnel portion (34) or a portion which in its cross section tapers off, for example. As is indicated in FIG. 9, the inlet funnel portion (34) or the portion which in its cross section tapers off is configured in such a manner that the warp-knitted spacer (3) is compressed in its transverse direction or perpendicularly to its cover layer (4, 5) or in the direction X in FIG. 9, respectively.

The receptacle (27) may be optionally configured in such a manner in a region or intermediate region B which is provided between the inlet region A and an outlet region C of the receptacle (27) that said receptacle (27) compresses the warp-knitted spacer (3) in two further mutually successive portions B1 and B2, for example. To this end, two pairs of slider elements (41) which compress the warp-knitted spacer (3) in the transverse direction or in the direction X, respectively, in the portions B1 and B2, are provided, for example.

The region B may likewise be configured such that no or no further compressing of the warp-knitted spacer (3) takes place (not illustrated). In this case, the slider elements (41) in FIG. 9, which are telescopically retractable in order for the warp-knitted spacer (3) to be compressed in the transverse direction or the direction X, may be dispensed with, where applicable.

Likewise, the inlet funnel portion (34) and the receptacle (27) may be configured in such a manner that the inlet funnel portion (34) in a first step compresses or pre-compresses the filter body (2), and that the receptacle (27) in at least one further portion, or in a step-wise manner by way of a plurality of successive portions B1 and B2, further compresses the filter body (2) to a sufficient dimension, in order for a fluid to be filtered (12) to be suitably filtered.

Optionally, the outlet region C of the receptacle (27) may also be additionally provided with an outlet funnel portion (35). The outlet funnel portion (35) in its cross section may be expanded, for example. On account thereof, the filter body (2) can slowly unfold or be slowly decompressed. The outlet region C of the filter unit (1) with its outlet funnel portion (35) is likewise shown in FIG. 9. Instead of expanding in its cross section, the outlet funnel portion (35) in its cross section may also taper off, as is indicated with a chain-dotted line, so as to compress the warp-knitted spacer (3) in the transverse direction or in the direction X.

Optionally, the filter unit (1), for cleaning the filter body (2) before and/or after a fluid to be filtered (12) flows through the filter body (2) in the receptacle (27), may additionally have a filter cleaning unit (40) or be linked to a filter cleaning unit (40), as is indicated with a dotted line in FIG. 9.

As a filter cleaning unit (40), the filter body (2) upstream or in the region of the inlet funnel portion (34) and/or downstream or in the region of the outlet funnel portion (35)

may have a rinsing device for rinsing the filter body (2) with water, water vapor and/or any other suitable liquid and/or gaseous cleaning medium.

This has the advantage that the endless tape (37) may be cleaned and thus always be repeatedly used prior to being replaced, for example.

The same applies to the tape (36) having its two ends. Once a portion has been used for filtering and has been moved out of the receptacle (27), said tape (36) may initially be cleaned by a downstream filter cleaning unit (40) and subsequently may be moved back into the receptacle (27), in order to filter a fluid to be filtered (12). Subsequently, the portion for filtering may be again cleaned by the downstream filter cleaning unit (40) and again be moved back into the receptacle (27), in order to filter a further fluid to be filtered (12). These steps may be repeated as often as the portion of the filter body (2) can be sufficiently cleaned so as to suitably filter a fluid to be filtered (12). If the portion of the filter body (2) can no longer be sufficiently cleaned, the tape (36) or endless tape (37), respectively, may be moved onward, such that the next clean portion of the filter body (2) is ready or disposed in the receptacle (27), in order to filter a fluid to be filtered (12). For this new clean portion of the filter body (2), the aforementioned steps of cleaning the portion of the filter body (2), of renewed filtering by the portion of the filter body (2) may be repeated until this portion of the filter body (2) is also consumed or can no longer be sufficiently cleaned, and the tape (36) or endless tape (37), respectively, has to be moved onward to the next clean portion.

FIG. 10 is a perspective view of a warp-knitted spacer (3), wherein the warp-knitted spacer (3) is additionally rolled.

The warp-knitted spacer (3) may likewise be employed in a corresponding filter unit, as is shown in an exemplary manner in the exemplary embodiments in FIGS. 1, 3, 5 to 9. The rolled warp-knitted spacer (3) is flowed through here transversely and/or in its longitudinal direction or the direction Y by a fluid to be filtered (12), as is indicated in FIG. 10 with the arrows P. The fluid to be filtered here flows between the cover layers (4, 5) of the warp-knitted spacer (3).

The warp-knitted spacer (3) here may be further compressed in at least one portion in the transverse direction or the direction Y, as is indicated with the two slider elements (41) in FIG. 10, which are movable in the direction X. The warp-knitted spacer (3) rolled therebetween may be additionally compressed in the transverse direction or in the direction X by moving together the slider elements (41) in the direction X or perpendicularly to the cover layer (4, 5) of the warp-knitted spacer (3).

Furthermore, the rolled warp-knitted spacer (3) may optionally also be additionally twisted, as is indicated with the arrows V in FIG. 10. Here, at least one end of the warp-knitted spacer (3) is rotated in relation to the other end of the warp-knitted spacer (3). Twisting here is intertwining and helically wrapping the warp-knitted spacer (3).

On account thereof, the rolled warp-knitted spacer (3) may likewise be additionally compressed in portions, as is shown in FIG. 11.

The rolled warp-knitted spacer (3) as the filter body 2 is additionally twisted in FIG. 11. On account thereof, a region B of the warp-knitted spacer (3) is further compressed, as is shown in FIG. 11. In order for the warp-knitted spacer (3) to be twisted, both ends of the warp-knitted spacer (3) are rotated in relation to one another. On account thereof, the region B between the ends of the warp-knitted spacer (3) is additionally compressed by twisting.

While the present invention has been described above by means of the preferred exemplary embodiments, said invention is not limited thereto but modifiable in a variety of ways. The embodiments and exemplary embodiments which have been described above may be combined with one another, in particular, particularly individual features thereof. For example, the warp-knitted spacer shown in FIGS. 10 and 11 may also be employed in the filter units (1) shown in FIGS. 1, 3, and 4 to 9. Likewise, a plurality of warp-knitted spacers instead of one warp-knitted spacer may also be provided as a filter body (2). Likewise, compressing of the warp-knitted spacer in FIGS. 5 to 11 is only exemplary. Furthermore, the warp-knitted spacer as shown in FIGS. 5 to 7 may be flowed through in the longitudinal direction, as in FIGS. 9 to 11, such that a fluid to be filtered flows along between the cover layers of the warp-knitted spacer.

LIST OF REFERENCE SIGNS

1 Filter unit
2 Filter body
3 Warp-knitted spacer
4 First cover layer
5 Second cover layer
6 Opening
7 Peripheral region
8 Threads
12 Liquid or fluid to be filtered, respectively
13 Filtered liquid or fluid, respectively
15 Cover plate
16 Openings of cover plate
17 Cover area (warp-knitted spacer)
18 Cover area (warp-knitted spacer)
19 Filter unit
21 Paper layer
22 Paper layer
23 Installation for generating gas bubbles
24 Gas bubbles
25 Deposits on threads
27 Receptacle
28 Inlet opening for filter body
29 Outlet opening for filter body
30 Liquid inlet
31 Liquid outlet
34 Inlet funnel portion
35 Outlet funnel portion
36 Tape
37 Endless tape
38 First roll
39 Second roll
40 Filter cleaning unit
41 Slider element

The invention claimed is:

1. A filter unit, having:
    at least one warp-knitted spacer which comprises a first and a second cover layer having in each case a multiplicity of openings which are delimited by peripheral regions, wherein threads extend from the peripheral regions of the first cover layer to peripheral regions of the second cover layer, and wherein the at least one warp-knitted spacer is at least rolled or rolled and twisted upon itself more than once, and further wherein:
        at least one of the first cover layer, the second cover layer, and/or the threads of the warp-knitted spacer are provided with disinfecting means, antimicrobially acting means, and/or a biofilm;

the at least rolled or rolled and twisted warp-knitted spacer is compressed in a region that is rolled or rolled and twisted upon itself more than once in a direction that is transverse to or perpendicular to the first and second cover layers;

the filter unit has the at least one warp-knitted spacer as a filter body, wherein the filter unit has a receptacle for receiving the warp-knitted spacer as the filter body;

the receptacle has at least one movable slider element which is configured to be movable between a starting position in which the warp-knitted spacer is decompressed or unfolded and an end position in which the at least one warp-knitted spacer is compressed transversely to the first and second cover layers to a maximum by the at least one movable slider element, so that a flow of liquid through the warp-knitted spacer between the first and second cover layers is still possible;

the receptacle is provided with an inlet funnel portion which tapers off in such a manner that the at least one warp-knitted spacer is compressed transversely to its cover layers; and the receptacle is provided with an outlet funnel portion which expands in such a manner that the at least one warp-knitted spacer unfolds, or which tapers off in such a manner that the at least one warp-knitted spacer is compressed transversely to its cover layers.

2. The filter unit as claimed in claim 1, wherein the at least one warp-knitted spacer in at least one portion in the transverse direction or perpendicularly to its cover layers is compressed and a fluid to be filtered flows along between the cover layers of the at least one warp-knitted spacer.

3. The filter unit as claimed in claim 1, wherein the receptacle is configured in such a manner that the at least one warp-knitted spacer which is received in the receptacle in at least one portion is compressible in the transverse direction or perpendicularly to its cover layers, and wherein in a filtering operation of the filter unit the liquid to be filtered and/or the filtered liquid substantially flows through the warp-knitted spacer between the first and second cover layers.

4. The filter unit as claimed in claim 3, wherein the filter body is configured as a tape having two ends, or as an endless tape, wherein the receptacle is configured in such a manner that the tape is introducible into the receptacle at one end, guidable through the receptacle and at the other end guidable out of the receptacle again, and wherein the tape for introducing into the receptacle is unwindable from a roll and introducible into the receptacle, and/or wherein the tape after being guided out of the receptacle is windable onto a roll.

5. The filter unit as claimed in claim 3, wherein the filter unit has a filter cleaning unit or is linkable to a filter cleaning unit for cleaning the warp-knitted spacer before and/or after a fluid to be filtered flows through the warp-knitted spacer in the receptacle.

6. The filter unit as claimed in claim 5, wherein the filter cleaning unit upstream and/or downstream of the receptacle is linked or connected to the filter unit for cleaning the warp-knitted spacer before and/or after a fluid to be filtered flows through the warp-knitted spacer in the receptacle.

7. The filter unit as claimed in claim 3, wherein the receptacle has at least one fluid inlet for directing fluid to be filtered to the at least one warp-knitted spacer and for flowing through the at least one warp-knitted spacer along its cover layers and the threads extending therebetween, and wherein the receptacle has at least one fluid outlet for subsequently discharging the fluid filtered by way of the at least one warp-knitted spacer.

8. The filter unit as claimed in claim 1, wherein a plurality of warp-knitted spacers are provided in the filter unit.

9. The filter unit as claimed in claim 1, wherein the filter body is composed of metal, a metal alloy, and/or a plastics material.

10. A method for nitrification of a liquid, the method comprising filtering the liquid through the filter unit of claim 1, wherein the filer unit is populated with microorganisms and/or is coated with chemicals or auxiliaries, whereby nitrification of the liquid results.

11. A method for nitrification of a liquid, the method comprising filtering the liquid through the filter unit of claim 1, wherein the warp-knitted spacer is populated with microorganisms and/or is coated with chemicals or auxiliaries, whereby nitrification of the liquid results.

12. The filter unit as claimed in claim 8, wherein the plurality of warp-knitted spacers are disposed beside one another.

13. The filter unit as claimed in claim 12, wherein the warp-knitted spacers are disposed beside one another and are additionally rolled and/or rolled and twisted.

14. The filter unit as claimed in claim 9, wherein the plastics material is polyurethane (PU).

15. The filter unit as claimed in claim 9, wherein the plastics material is coated with a metal or a metal alloy.

16. The filter unit as claimed in claim 14, wherein the plastics material is coated with a metal or a metal alloy.

* * * * *